May 5, 1931.  M. CHRISTMAN  1,803,746
LUBRICATING DEVICE
Filed July 25, 1927  3 Sheets-Sheet 1
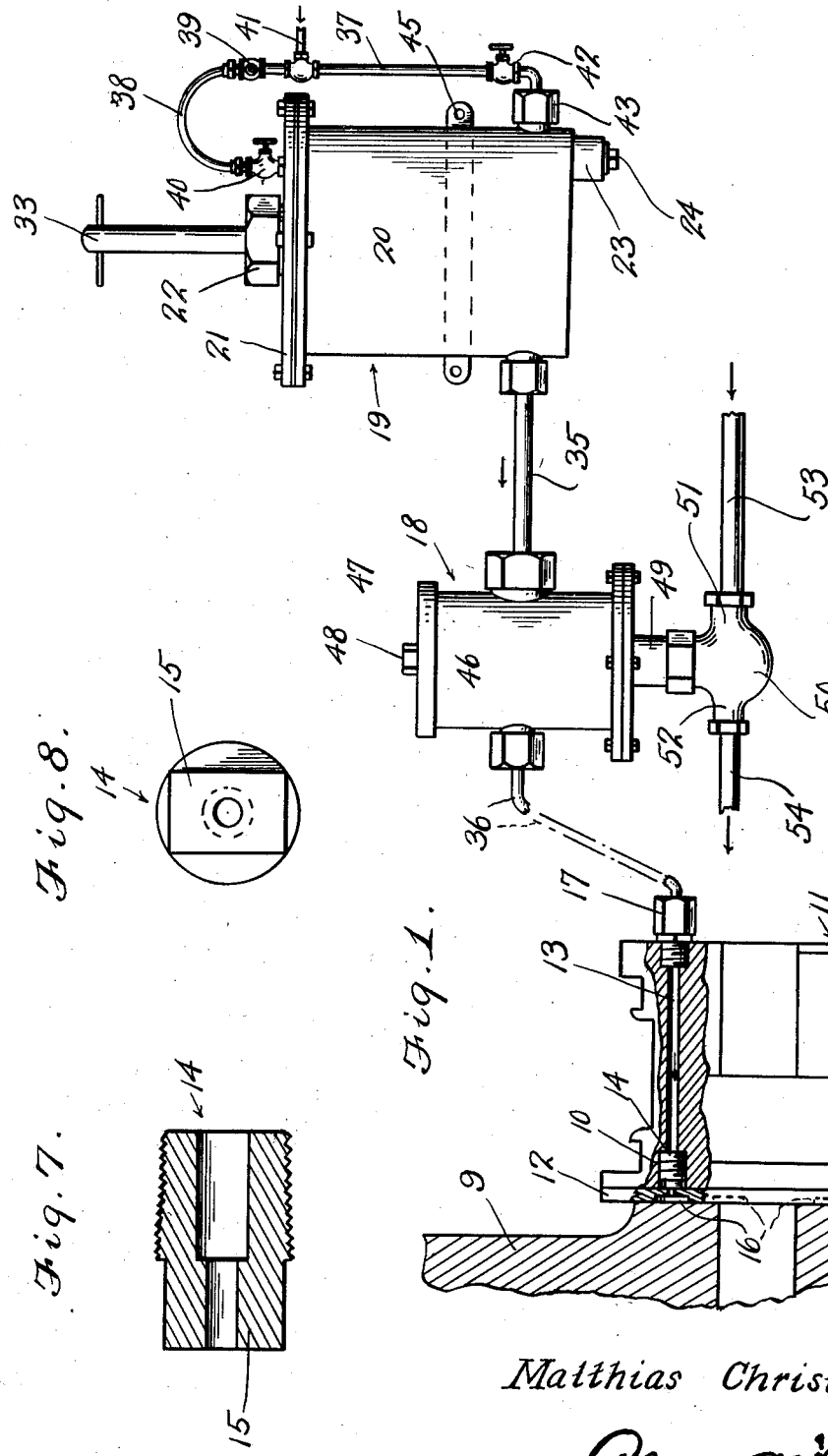
Inventor
Matthias Christman
By Clarence A. O'Brien
Attorney May 5, 1931.  M. CHRISTMAN  1,803,746
LUBRICATING DEVICE
Filed July 25, 1927   3 Sheets-Sheet 2

Inventor
Matthias Christman
By *Clarence A. O'Brien*
Attorney

May 5, 1931.  M. CHRISTMAN  1,803,746
LUBRICATING DEVICE
Filed July 25, 1927  3 Sheets-Sheet 3
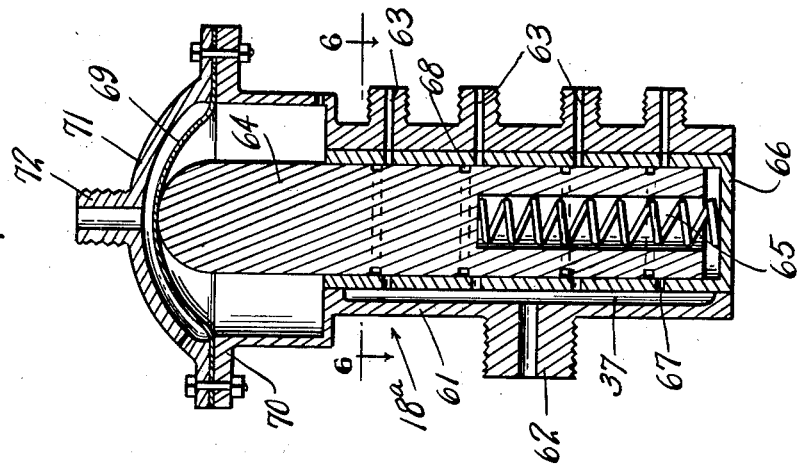
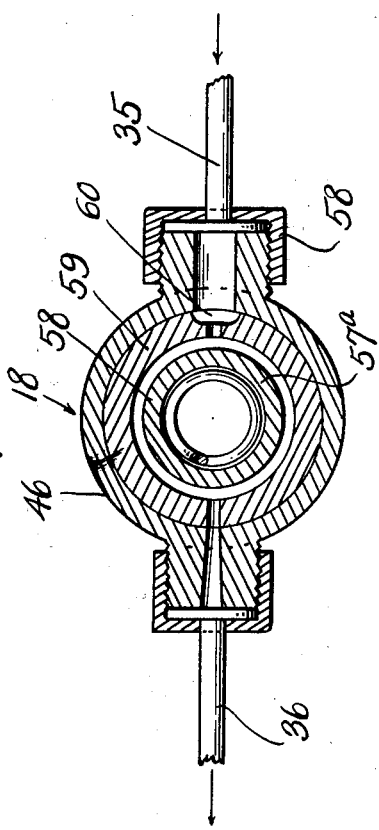
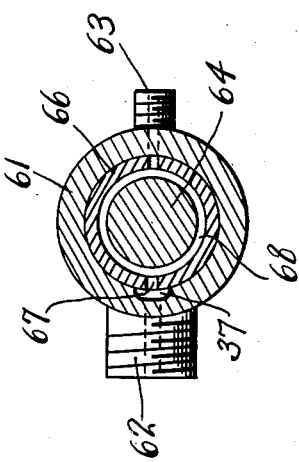
Inventor
Matthias Christman Patented May 5, 1931

1,803,746

UNITED STATES PATENT OFFICE

MATTHIAS CHRISTMAN, OF SPRINGFIELD, MISSOURI

LUBRICATING DEVICE

Application filed July 25, 1927. Serial No. 208,282.

The present invention relates to an improved lubricating device which is especially, although not necessarily, adapted for use in association with a journal box such as is employed in connection with railway rolling stock.

More specifically, the invention has reference to means for automatically supplying a predetermined quantity of lubricant through a passage in a journal box to the contacting surfaces between a hub plate and wheel hub.

In accordance with the present invention I propose to modify the ordinary journal box by providing it with an auxiliary passage for the lubricant and to so locate this passage as to supply lubricant thereto through pockets in a hub plate which is interposed between the journal box and an adjacent face of the wheel hub.

In carrying out this idea, I provide an especially constructed lubricant supply means which include a force feed cup, a conduit leading from the cup to the passage in the journal box, and an automatically operable control and regulating device located in the conduit between the box and cup.

Novelty is thought to reside in the particular construction of the force feed cups which includes a pressure actuated piston and valved piping connected with the body of the cup to move the piston either up or down, as required.

Another feature upon which stress is to be placed is a pressure actuated control and regulating device which is constructed to intermittently control the flow of the lubricant through the conduit at desirable intervals of time.

The particular details from which these separate parts are constructed will become more readily apparent from the following description and drawings.

In the drawings:—

Figure 1 is a side view in elevation and section showing a fragmentary portion of a wheel, a hub plate, a modified journal box, the force feed cups, the conduits, and the control device located in said conduits.

Fig. 4 is a horizontal section taken approximately upon the plane of the line 4—4 of Fig. 2, looking downwardly in the direction of the arrow.

Fig. 5 is a view also like Fig. 2, showing a slightly different embodiment of control device.

Fig. 6 is a cross section, taken on the line 6—6 of Fig. 5.

Fig. 7 is a sectional view of one of the details.

Fig. 8 is an end view of said detail looking in a direction from left to right, in Fig. 7.

Figure 3:
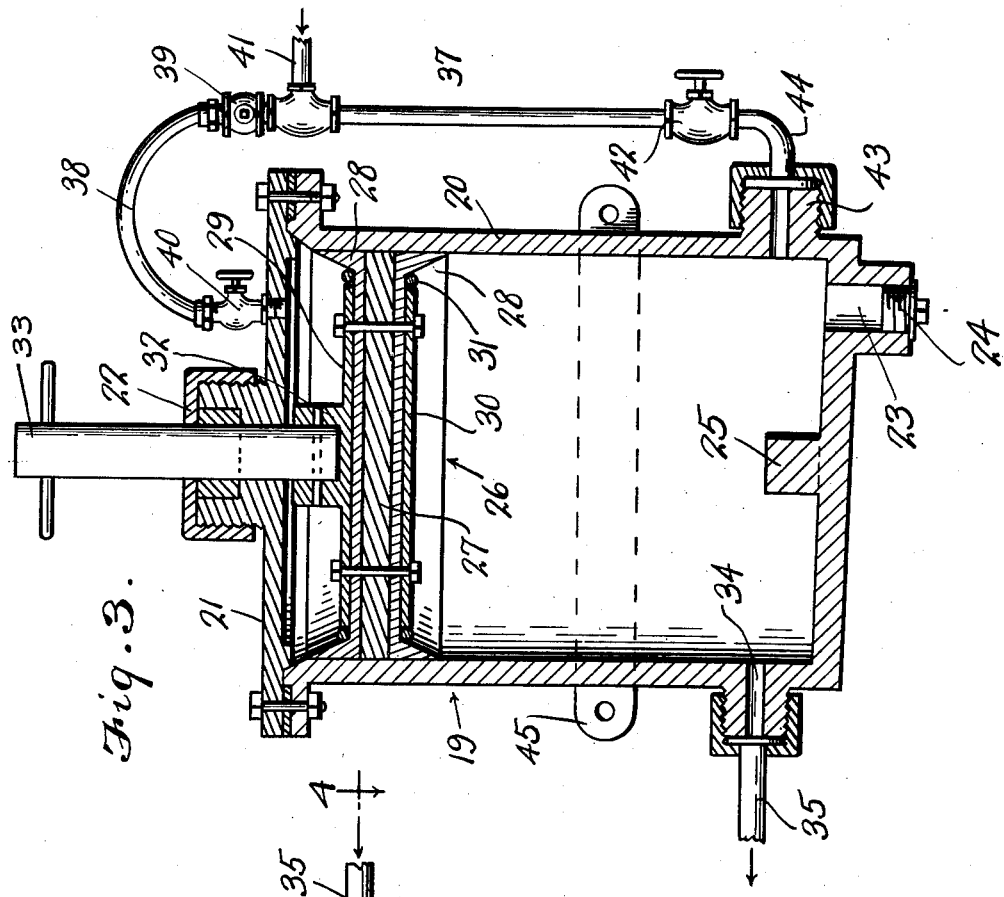
Fig. 3 is likewise an enlarged sectional view through the force feed lubricant containing and supply cup.

In Fig. 1, the reference character 9 designates a fragmentary portion of an ordinary car wheel, 10 represents the axle, 11 represents generally the journal box, and 12 the hub plate which is interposed between the journal box and one face of the hub portion of the wheel 9.

In accordance with the present invention the journal box 11 is provided with a bore 13 providing a lubricant passage, this being counterbored at its opposite end. This bore is of required proportion and located in the inner counter-bore is a screw threaded plug 14 formed as shown in Figs. 7 and 8. This includes a reduced polygonal portion 15, the central opening or passage of which is reduced in diameter to regulate the flow of the lubricant.

This passage in fact, is of a diameter considerably less than the bore 13. However, the proportions of these respective passages may be varied to suit the circumstances existing. Incidentally, I would state that the hub plate 12, which may be of any appropriate configuration, is provided with circumferentially spaced pockets 16 for distributing the lubricant, and the plug 14 is in communication with one of the pockets through the medium of the small port as shown at the left in Fig. 1.

It will be noticed that the pockets are so located as to evenly distribute the lubricant to the contacting face of the hub portion of the wheel 9. At the opposite end of the bore 13, we find an appropriate fitting 17 which serves as a coupling in a manner to be hereinafter described.

Attention is now directed to the fact that the reference character 18 designates generally the automatic regulating or control device while the reference character 19 designates the force feed supply cups.

Considering now the construction of these cups, attention is invited to Fig. 3, wherein it will be seen that the same comprises a body portion 20 having an outstanding flange at its open upper end. Bolted to this flange is an appropriate cover plate 21, carrying a suitable stuffing box 22. Packing is of course interposed between the cover plate and flange to provide a fluid-tight joint. At the bottom of the cup is a neck 23 having a closing plug 24. This may operate as a drain and also as a means for connection of grease guns for supplying the cup with appropriate lubricant and grease.

Within the cup and at the center of the bottom is a stop 25 for a reciprocating piston 26. The piston is of laminated construction, the same including a plate 27 on opposite sides of which are packing elements 28 bolted in place by clamping disks 29 and 30 respectively.

It will be noticed that these packing elements are provided with peripheral flanges in tight contact with the internal wall of the cup. Also, expanding rings 31 may be employed if desired. Then too, it will be noticed that the upper disks 29 carry a connection 32 for a gauge stem 33. The stem 33 extends up through the stuffing box 22. At the left hand side and adjacent the bottom is a discharge 34 for the lubricant and the conduit is connected with this. I use the term "conduit" to define the piping section 35 and 36 as shown in Fig. 1.

The pipe section connects the cup 19 with the control device 18, while the pipe 36 connects the control device with the fitting 17. The conduit may be of any suitable construction of course. While considering the cup, I find it convenient to mention that fluid under pressure is employed for actuating the piston 26. The fluid may be either liquid or air. In either instance the fluid is applied to the top and bottom of the cup on opposite sides of the piston. This is done by employing a pipe 37 which is connected to the cover plate 21 through the medium of a goose-neck 38. This goose-neck includes a check valve 39 and a hand control valve 40, the last named valve being connected with the cover plate as shown in Fig. 3.

The supply pipe designated by the reference character 41 is coupled to the pipe 37. Also at the bottom of the pipe 37, is another manually controlled valve 42 connected to the intake nipple 43 thru the medium of an appropriate elbow 44. With this arrangement, it will be seen that the fluid can be supplied to move the piston downwardly, by introducing it through the cover plate 21, or can be introduced through the intake nipple 43 to move the piston upwardly.

Any convenient attaching bracket, such as represented at 45 is provided for supporting the cup at an appropriate place on the car, or locomotive.

Figure 2:
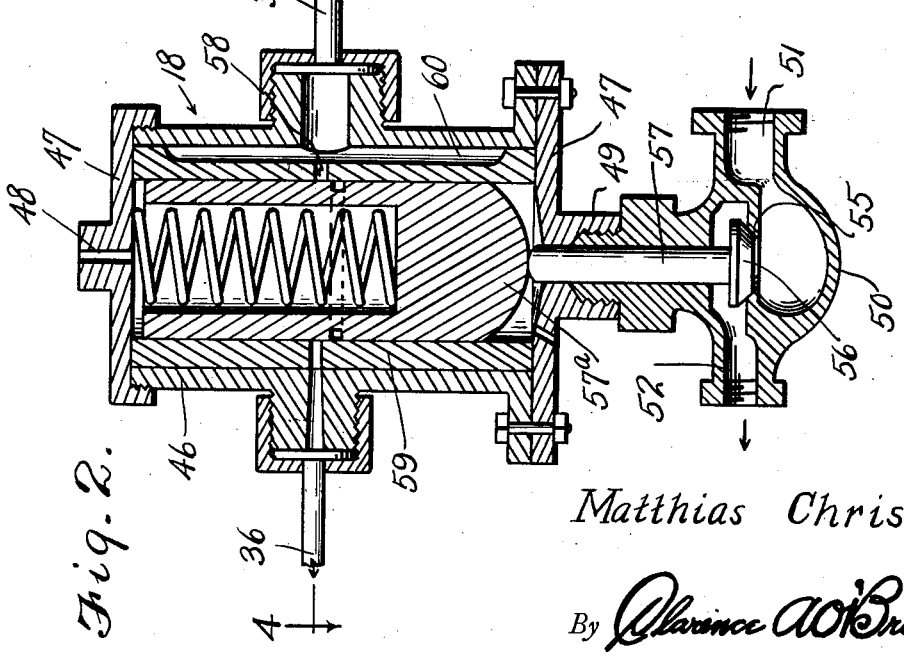
Fig. 2 is a sectional view on an enlarged scale through one embodiment of the control device.

Considering now Fig. 2, it will be observed that the control device 18 comprises an open ended cylinder 46 having a removable cap 47 at its top, said cap being provided with a vent 48. Then there is a bottom plate 47 bolted or otherwise fastened in place, this having a vent and carrying a coupling 49 for a special globe valve 50. The casting from which this valve is formed is constructed for connection with the coupling 49 and is provided with branches 51 and 52. An air conducting pipe (see Fig. 1), designated at 53 is connected with the branch 51, and this serves to supply air to the valve 50.

Also an exhaust or discharge pipe 54 is provided and this is coupled to the branch 52. The valve 50 is provided with an apertured partition 55 forming a seat for the head 56 of a plunger operating stem 57. The stem 57 extends up through the connection 49 and into the interior of the cylinder 46, and there has engagement with the lower rounded end of a spring pressed plunger 57.

As here shown, the plunger is provided with a circumferential groove 58 which is adapted to aline with diametrically opposite ports in a removable bushing 59 inside of the cylinder.

On the intake side the bushing is provided with a vertical groove 60 which is in communication with the pipe section 35, and also with the adjacent port in the bushing. Normally, the spring serves to force the plunger 57 downwardly, and to close the valve head 56. However, when sufficient pressure is introduced through the pipe 53 into the valve 50, the stem 57 is lifted, thus raising the plunger against the tension of the spring, and serving to aline the grooves 58 with the complemental ports in the bushing 59. This therefore opens communication between the pipe sections 35 and 36 and allows the lubricant to flow to the journal box 11.

Attention is now called to Figs. 5 and 6 wherein it will be noticed that the reference character 18a designates a slightly different embodiment for an automatic control device. It was of course observed, that in the form just described, the device is constructed to supply a single journal box. However, it is desirable to supply, under certain conditions, a number of journal boxes from a single conduit.

The device represented in Figs. 5 and 6 is employed to accomplish this end. This will include a cylinder 61 having a single pipe connection 62 on one side for connection to the pipe section 35. Then on the opposite side we find a series of screw threaded nipples 63 with which various pipe sections 36 may be connected for supplying different journal boxes at separated points on the car.

In this form, we find a plunger 64 pushed upwardly by a coiled spring 65. The plunger operates within a cup-like bushing 66. The bushing is provided with a series of ports on one side in communication with a vertically elongated intake groove 37. On the opposite side it has a series of vertically spaced ports in communication with passages in the nipples 63. Then too, the plunger has vertically spaced circumferential grooves 68 which simultaneously register with the nipples 63, when the plunger is forced downwardly.

In order to accomplish this downward movement, I provide a resilient pressure operated diaphragm 69 clamped between the outstanding flange 70 and the removable bonnet 71. The bonnet has a suitable vent and a pipe connection 72 for an air supply pipe, the incoming air of course flexing the diaphragm 69 downwardly, just accomplishing a downward sliding movement of a plunger 64 and causing the grooves in the plunger to register with the multiplicity of ports in an obvious manner.

The operation of the apparatus is as follows:—

First, the cup 19 is filled with an appropriate lubricant of the fluid. It is preferably filled by a grease gun through the medium of the neck 23 after removing the plug 24 (see Fig. 3). Of course, if the piston 26 is down at this time, fluid under pressure is introduced through the pipe 41 from an appropriate source and passes downwardly through the pipe 37 and through the valve 42 which is then opened, and into the intake connection 43. The fluid under pressure beneath the piston causes the piston to move upwardly to the position shown in Fig. 3. The stem 33 operates as a guide to indicate the position of the piston.

After filling the cup, the valve 42 is closed and the valve 40 is opened. Then the pressure comes down on top of the piston, causing the piston to move downwardly and to eject the lubricant through the discharge 34 and pipe 35.

In order to allow the lubricant to pass on through the control and regulating device 18, fluid under pressure is introduced into the valve 50 from any suitable source and preferably at intermittent periods of time. Then, as before indicated, the stem 57 (see Fig. 2), moves upwardly to actuate the spring-pressed plunger and to allow the lubricant to pass on through this device into the pipe section 36. From the pipe section 36, it passes through the bore 13 in the journal box 11. Then through the reducing plug 14, and finally through the port in the hub plate 12.

As the hub plate is provided with a series of pockets, it serves to evenly distribute the lubricant against the flat face of the hub portion of the wheel hub 9.

The operation of the control device represented in Figs. 5 and 6 is substantially the same except that the pressure introduced through the bonnet 71 operates upon the flexible diaphragm and the diaphragm in turn actuates the plunger.

It is thought however, that by considering the detailed description in connection with the drawings, a clear understanding of the structure as well as the operation and advantages of the invention will be clear.

It is understood that the device may be mounted on any appropriate part of a car, or on the locomotive, and the piping of suitable length and construction employed for conducting fluid under pressure. Exhaust means and the locomotive may be employed for operating the piston and plunger, etc., or air from the air pump on the locomotive may be employed to advantage.

The manner of rigging and mounting the device will be varied to suit different existing conditions and this will be clear to persons skilled in the art to which the invention relates. Also, I wish it to be understood that changes in shape, size, and re-arrangement of parts may be resorted to within the scope of the adjoined claim if desired.

Having thus described my invention, what I claim as new is:—

In a lubricating system of the class described a valve comprising a cylindrical casing having an inlet port, a cylindrical bushing located in the casing, one of said parts having a longitudinal groove therein which, with a portion of the other part, forms a chamber for receiving lubricant introduced through the said port, said bushing having ports arranged on diametrically opposite sides thereof, the ports on one side being in communication with said groove, the casing having outlet ports which are in communication with the ports in the other side of the bushing, a plunger slidably mounted within the bushing and having annular grooves therein, a spring for normally holding the plunger in position with the grooves out of alinement with the ports in the bushing, and means for moving the plunger to a position where each of its grooves will aline with a pair of the diametrically spaced ports in the bushing.

In testimony whereof I affix my signature.

MATTHIAS CHRISTMAN.